United States Patent
Dolesh et al.

(10) Patent No.: US 7,445,078 B2
(45) Date of Patent: Nov. 4, 2008

(54) VEHICLE CONTROL INTEGRATION

(75) Inventors: William L. Dolesh, Richmond, IN (US); Robert Gordon Vit, Hagerstown, IN (US); Gerhard Engelbrecht, Richmond, IN (US); Chris Black, Hagerstown, IN (US); Michael Joseph LaVere, Hagerstown, IN (US); James Irwin Grubaugh, Richmond, IN (US)

(73) Assignee: Autocar, LLC, Hagerstown, IN (US)

( * ) Notice: Subject to any disclaimer, the term of this patent is extended or adjusted under 35 U.S.C. 154(b) by 384 days.

(21) Appl. No.: 11/120,802

(22) Filed: May 2, 2005

(65) Prior Publication Data

US 2006/0243506 A1 Nov. 2, 2006

(51) Int. Cl.
*B60K 26/00* (2006.01)
(52) U.S. Cl. ............................. 180/324; 180/315
(58) Field of Classification Search .......... 180/315, 180/281, 286, 321–324
See application file for complete search history.

(56) References Cited

U.S. PATENT DOCUMENTS

| | | | |
|---|---|---|---|
| D162,507 S | 3/1951 | Arenberg et al. | |
| 2,638,232 A * | 5/1953 | Perkins | 212/285 |
| D206,322 S | 11/1966 | Ornas, Jr. et al. | |
| 3,394,697 A | 7/1968 | Lewis | |
| 4,447,860 A | 5/1984 | Stone et al. | |
| D276,422 S | 11/1984 | Montgomery | |
| 4,505,510 A | 3/1985 | Lepoix | |
| 5,226,497 A * | 7/1993 | Beaton | 180/53.4 |
| D339,786 S | 9/1993 | Allendorph et al. | |
| 5,251,722 A * | 10/1993 | Scratchard | 180/321 |
| D375,071 S | 10/1996 | Darley | |
| D395,030 S | 6/1998 | Hellhake et al. | |
| D427,613 S | 7/2000 | Altmann et al. | |
| D428,022 S | 7/2000 | Altmann et al. | |
| D434,425 S | 11/2000 | Rossow et al. | |
| D439,257 S | 3/2001 | Rossow et al. | |
| 6,308,441 B1 * | 10/2001 | Bolitho | 37/411 |
| D450,277 S | 11/2001 | Onopa | |
| 6,533,316 B2 * | 3/2003 | Breed et al. | 280/735 |
| 6,719,361 B1 | 4/2004 | Adams et al. | |
| 6,722,839 B2 | 4/2004 | Bingman | |
| 6,828,924 B2 | 12/2004 | Gustavsson et al. | |
| 6,830,537 B1 | 12/2004 | Hollenbeck | |
| 6,881,022 B2 | 4/2005 | Feller | |
| 6,882,917 B2 | 4/2005 | Pillar et al. | |
| 6,885,920 B2 | 4/2005 | Yakes et al. | |
| 2006/0149442 A1 * | 7/2006 | Delaney et al. | 701/36 |

* cited by examiner

*Primary Examiner*—Kevin Hurley
*Assistant Examiner*—Drew J. Brown
(74) *Attorney, Agent, or Firm*—Banner & Witcoff, Ltd.

(57) ABSTRACT

A vehicle (10) such as a heavy-duty truck (10) has an operator cab and a body section. The truck (10) has controls that control operating parameters associated with the operator cab and controls that control operating parameters associated with the body section. The truck (10) has a control system (12) that integrates the controls for the operator cab and the controls for the body section.

12 Claims, 6 Drawing Sheets

VEHICLE CONTROL INTEGRATION

CROSS-REFERENCE TO RELATED APPLICATIONS

None.

FEDERALLY SPONSORED RESEARCH OR DEVELOPMENT

None.

TECHNICAL FIELD

The invention relates to vehicle controls and, more particularly, to a control system for a truck that integrates cab controls and body controls of the truck.

BACKGROUND OF THE INVENTION

Vehicles such as heavy-duty trucks are well known in the art. Such heavy-duty trucks may take various forms including refuse hauling trucks, dump trucks, cement trucks and other types of trucks. These types of trucks typically have an operator cab and a body section that will vary depending on the type of truck. For example, a refuse hauling truck has a body section designed for receiving, manipulating and hauling refuse. These trucks will also have controls associated with operating parameters for the operator cab and controls associated with operating parameters for the body section. While such heavy-duty trucks according to the prior art provide a number of advantageous features, they nevertheless have certain limitations.

The present invention is provided to overcome certain of these limitations and other drawbacks of the prior art, and to provide advantages and aspects not provided by prior trucks. A full discussion of the features and advantages of the present invention is deferred to the following detailed description, which proceeds with reference to the accompanying drawings.

SUMMARY OF THE INVENTION

The present invention provides an integrated control system for a truck. In a preferred embodiment of the invention, the control system integrates controls associated with an operator cab of the truck with controls associated with a body section of the truck.

According to one aspect of the invention, a vehicle such as a heavy-duty truck having an operator cab and a body section is provided. The vehicle has controls that control operating parameters associated with the operator cab and controls that control operating parameters associated with the body section. The vehicle has a control system that integrates the controls for the operator cab and the controls for the body section.

According to another aspect of the invention, a control system for a vehicle having a cab and a body is provided. The control system includes a cab control, a body control, and a control area within the cab having a body controller. The body controller is operably associated with the cab control. The body controller receives the body control in a predetermined receptor of the body controller such that the cab control is integrated with the body control.

According to yet another aspect of the present invention, an integrated control system is provided. In this embodiment of the present invention, the body control panel is connected to the plurality of cab controls and the plurality of body controls. The connection of the body control panel to the body controls is completed by a single plug-in of the body controls.

According to a further aspect of the present invention, an integrated control system is provided. The integrated control system includes a cab having a tunnel, a plurality of cab controls, and a body control panel disposed within the tunnel of the cab. The body control panel is connected to the plurality of cab controls and adapted to receive a plurality of body controls by a single plug-in. A body programmable logic controller with the body control panel controls the body controls.

In accordance with another aspect of the present invention, a truck having an integrated control system is provided. The truck includes a truck chassis having a frame, a cab, a plurality of cab controls, a plurality of body controls, and a body control panel disposed within the cab. The control panel is connected to the plurality of cab controls and the plurality of body controls. The connection of the control panel to the body controls is completed by a single plug-in of the body controls attached to the chassis and remote from the cab.

In accordance with yet another aspect of the present invention, a truck having an integrated control panel is provided. The truck includes a cab, a plurality of cab controls, a body having a storage area, a chassis, a plurality of body controls, and an integrated body control panel situated within the cab. The cab has an operator seat, a passenger seat, a passenger-side mirror, a tunnel, and a lower passenger-side window. The body and cab are coupled to the chassis. The body control panel is connected to the plurality of cab controls and the plurality of body controls. An upper extent of the integrated body control panel is situated below an upper plane defined by the tunnel.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
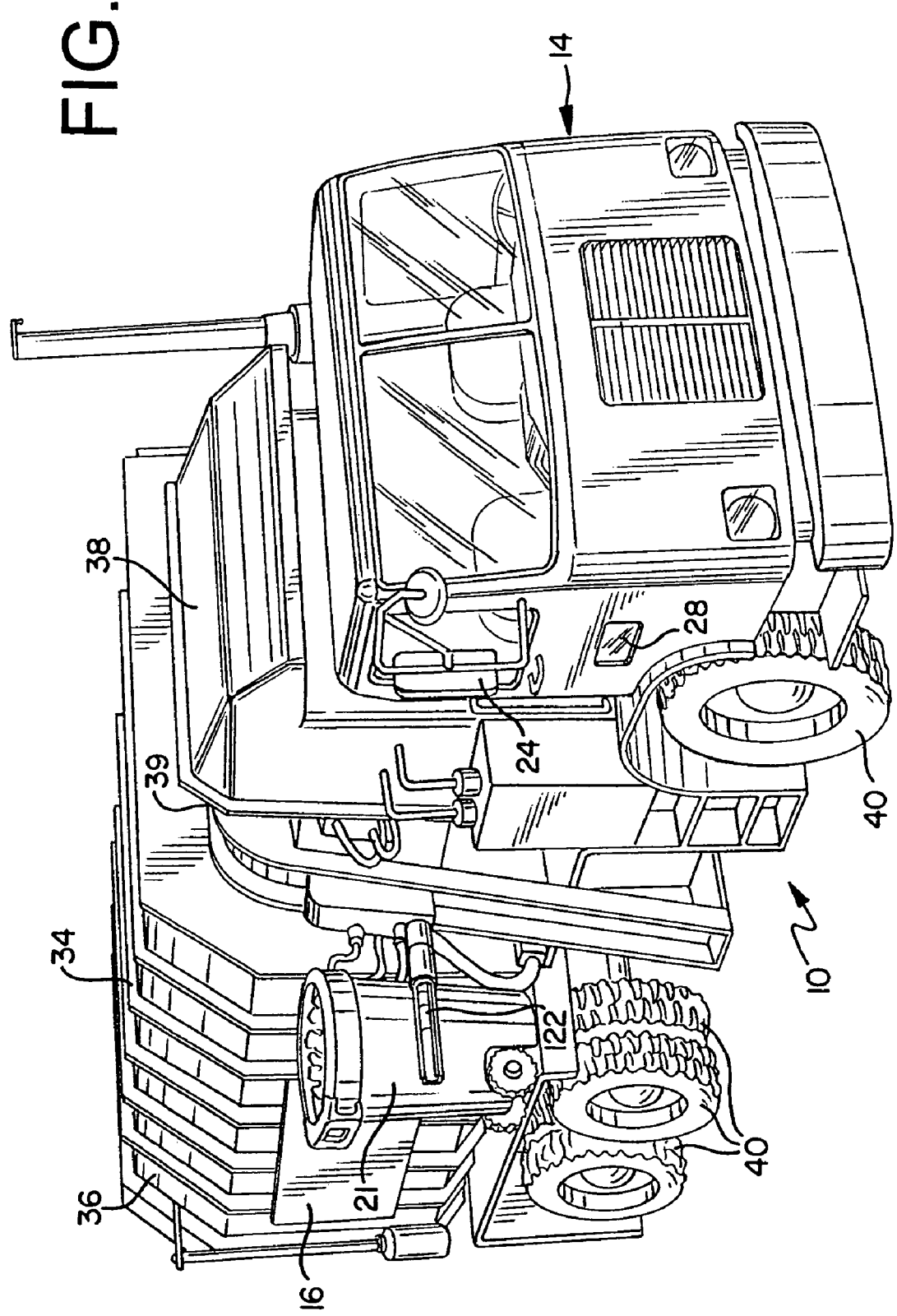
FIG. 1 is a perspective view of a vehicle of the present invention in the form of a heavy-duty truck.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows a vehicle of the present invention, generally designated with the reference numeral 10. In one preferred embodiment, the vehicle is in the form of a heavy-duty truck such as a refuse hauling truck. It is understood that the present invention can be incorporated into various types of vehicles, including for example front loaders, side loaders and rear loaders. The general structure of the truck 10 will first be described followed by a description of a control system 12 used to control the operating parameters of the truck 10.

Truck 10 generally includes a vehicle body 16, an operator cab 14 and a chassis 42. When assembled, the body 16 and the operator cab 14 are mounted on the chassis 42. The chassis 42 is a standard truck chassis and may have generally rectangular steel frame members or otherwise a structural frame. As is known in the art, the chassis 42 is supported on springs and attached to axles which in turn are attached to wheels 40.

The chassis 42 may receive several different configurations of the body 16. As illustrated in FIG. 1, in a preferred embodiment for a refuse truck, the body 16 includes a storage area 34, a loading area 36, a reception area 38, an open hopper 39 and an articulating arm 122. Refuse 21 may be loaded in the reception area 38 by use of the articulating arm 122. Refuse 21 is stored in the storage area 34 and generally compacted within the body 16. However, as understood by those of skill in the art, other bodies for different purposes such as rear loaders, dump trucks and cement trucks may be used in connection with the present invention. Numerous components of the body 16 are capable of being adjusted, manipulated or otherwise actuated such as lifting the axles, manipulating the articulating arm 122, opening the hopper 39, and compacting the refuse.

The components of the body are controlled and/or monitored by one or more body controls 48. In one embodiment, all of the components of the body 16 are controlled by the body controls 48. As illustrated schematically in FIG. 7, the body controls 48 includes a group of wires 50 which are connected to and associated with components of the body 16. The wires permit the body controls 48 to communicate with the components of the body 16. The wires 50 may be multiplexed wherein multiple signals can travel along a single wire and thus permit simultaneous communication of two or more messages at the same time. By being multiplexed, the wires 50 permit the body controls 48 to be more easily adapted through use of computer software. Multiplexing also utilizes less wires and saves space within the cab and body.

By way of example and without limiting the generality of the present invention, the body controls 48 for a truck may control hopper lights, strobe lights, rear lights, side lights, whether the pump is on or off, whether the street side or curb street controls are active, whether the outside controls are on or off, whether to stand and retract the lift, whether the fork is wide or narrow, whether the body is up or down, whether the tailgate is open or closed, whether the top door of the body is open or closed, whether the tag wheels are in an upper inactive position or a lower active position, whether the pusher wheels are in an upper inactive position or a lower active position, whether an automatic loading mode is on or off, and whether the emergency stop is engaged. Other body controls 48 are also possible depending on the type of truck. When the vehicle is in the automatic loading mode, the vehicle automatically locates a garbage can or other item for pick-up, automatically engages the item with the articulating arm and lifts the item into the body. The body controls 48 may also includes various warning or safety lights such as a light indicating whether the arms are above the body, and whether the truck is an overheight condition (e.g., the body is in the up position and the vehicle is driving over a certain speed).

In many cases, the body controls 48 may communicate with or be associated with at least one component of the cab 14. For example, the warning light for whether the truck is overheight requires that the body controls 48 communicate with the body 16 to determine whether the body 16 is in the up position, and requires that the body controls 48 communicate with the cab 14 to determine whether the vehicle is driving over a certain speed. The body controls 48 may be maintained within a structural housing such as a box.

The operator cab 14 is the area in which the operator sits or stands while operating the vehicle 10. Although illustrated in FIGS. 2-6 with the cab 14 configured for the operator to sit on the left side of the vehicle, the operator may be seated on either side of the vehicle. Alternatively, there may be operator seats on both sides of the cab along with steering wheels on both sides of the cab 14. The cab 14 may also be configured such that the operator in an a standing position. The operator cab 14 includes an operator seat 18, a passenger seat 20, a steering wheel (not shown), a passenger-side mirror 24, a rear view mirror (not shown), a tunnel 26, dash board 27, storage areas 118 and a passenger-side lower window 28. For certain trucks, a joystick 22 is also provided to control the articulating arm. The tunnel 26 is the center portion of the cab 14 and is situated between the operator seat 18 and the passenger seat 20. The tunnel 26 typically houses numerous wires used to control various components of the vehicle. A control panel may also be considered to be incorporated with the tunnel 26.

The cab 14 has numerous components such as an ignition, a throttle, gear shifter, speedometer, turn signals, and headlights, a heater and air conditioner, mirrors and windows. Other cab controls may also be included as are known. The components are controlled by a cab control 30. The cab control 30 includes a group of wires 32 associated with and connected to at least some of the components of the cab 14. The wires 32 may optionally be multiplexed. When properly configured, computer software associated with the controller in the cab can reroute devices and signals if necessary. For example, if the left turn signal burnt out, the control system could automatically cause the parking light to flash and operate as a substitute turn signal.

Figure 2:
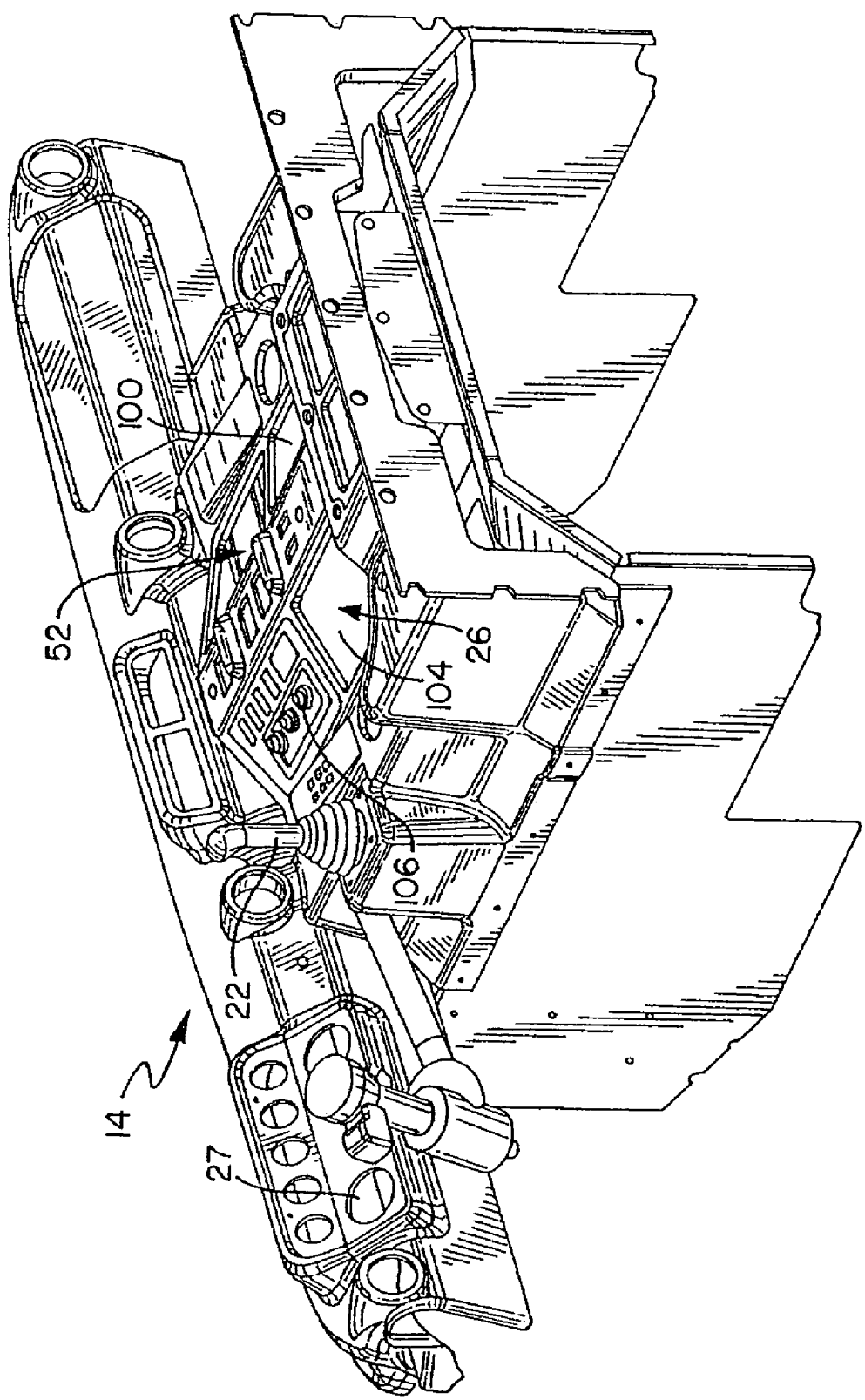
FIG. 2 is a partial perspective view of an interior of a cab of a vehicle of the present invention.
Figure 3:
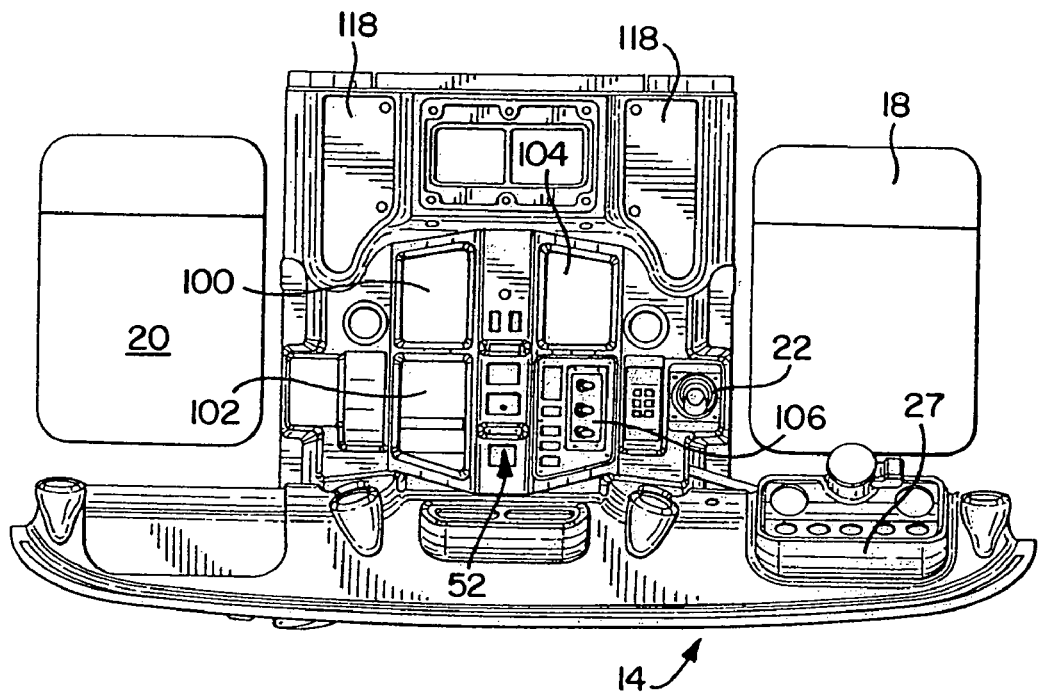
FIG. 3 is a partial top plan view of an interior of a cab of a vehicle of the present invention.
Figure 7:
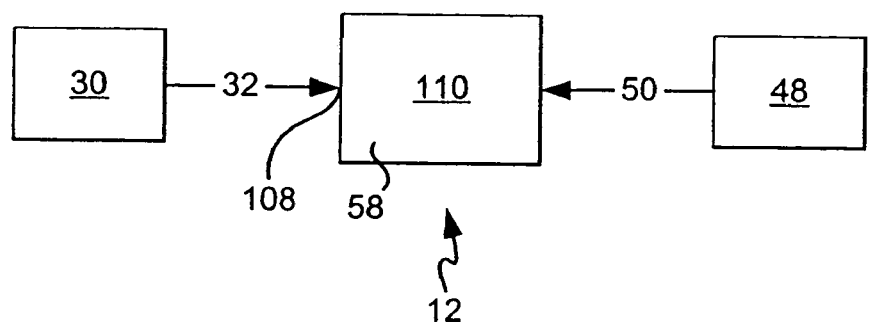
FIG. 7 is a schematic view of the present invention.

As shown in FIG. 7, the vehicle 10 includes a control system 12. The control system 12 includes a body control area 52 for controlling the components of the body 16. The body control area 52 is disposed within the cab 14 and may be in the form of a panel or other predetermined structure. The panel may include several separate compartments 100, 102, 104 and 106. Each of the compartments 100, 102, 104 and 106 may fit the body controls, cab controls or both. As shown in FIGS. 2 and 3, the compartment 106 contains a cab control for controlling the air conditioner unit. Compartments 100, 102 and 104 are illustrated in FIGS. 2 and 3 as containing a plate cover.

Figure 4:
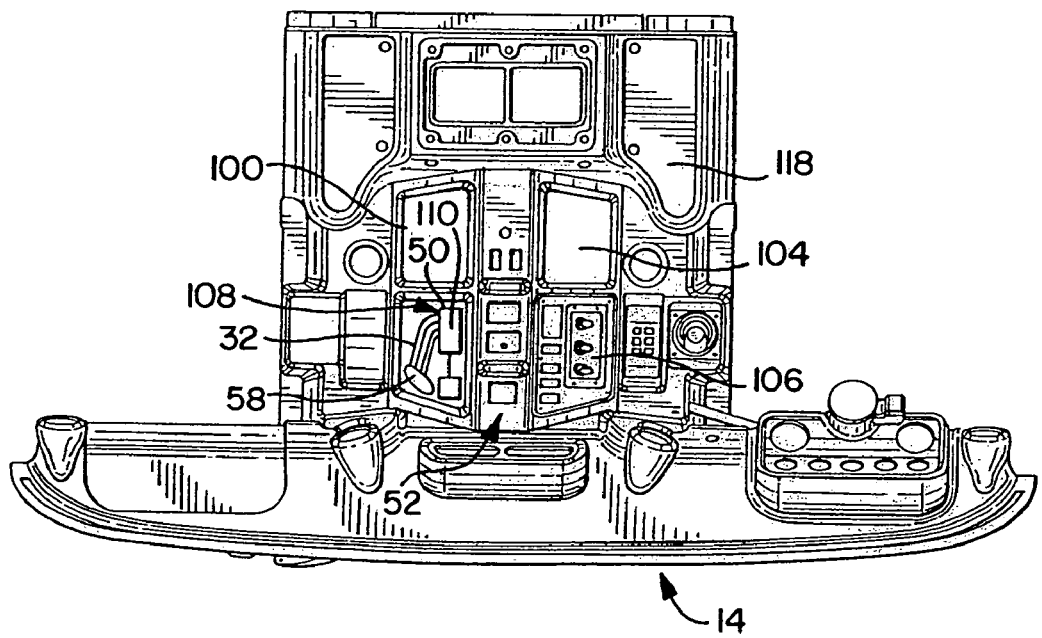
FIG. 4 is a partial top plan view of an interior of a cab of a vehicle of the present invention with a panel removed.

Turning now to FIG. 4, the plate cover of the compartment 102 is shown as having been removed revealing the wires 32 for the cab control 30, a connection point 108 or predetermined receptor, and a body controller 110. The body controller 110 may be a programmable logic controller or other controller as known to those in the art. The body controller 110 is further operably associated with the cab controls 30 wherein the controls 30 are connected via the wires 32 to the controller 110. When connecting the body 16 to the vehicle, a body builder can easily remove the plate cover as shown and insert the body controls 48 into the compartment 102 (or the other compartments). The body controls 48 fit into the connection point 108, or predetermined receptor, which has all of the wires 32 that are necessary to operate the components of the body 16. Alternatively, the cab builder may provide wires 32 ready for connection to body controller 110 at connection point 108, or predetermined receptor. The body builder removes the plate cover and connects the wires 32 to the body controller 110 so that body controls 48 and the cab controls 30 are operable. The cab builder may provide a wiring schematic or other information to the body builder so that the body builder can determine what cab feature each of the wires 32 controls or is connected to. The body builder then connects wires 32 into controller 110 as desired or necessary to operate the body controls 48.

For example, the strobe light of the body 16 is connected through wires to the reverse mode of the vehicle contained in the cab 14. Thus, when the vehicle is in reverse, the strobe light of the body 16 automatically turns on. All of the connections for use with a particular body control 48 are present at the connection point 108 and consequently the body builder need not tap into any other wires in the cab 14. The wires 32 and the connection point 108 fit completely within the compartment 102 of the body control area 52. The body controller 110 is pre-configured to provide appropriate instructions and logic to communicate between the cab controls 30 and the body controls 48.

Figure 5:
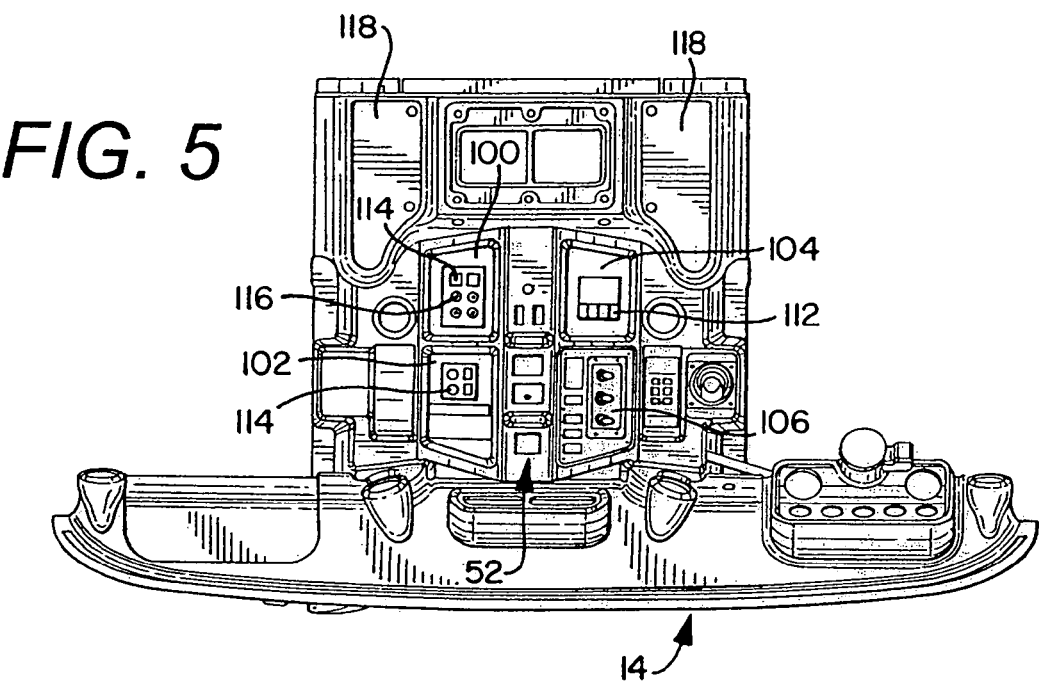
FIG. 5 is a partial top plan view of an interior of a cab of a vehicle of the present invention with cab controls.

Moving to FIG. 5, the control system 12 is illustrated after the body controls 48 have been inserted into the compartment 102. The plate cover of the compartment 102 has been replaced with a plate cover for the controls. The control area typically includes various actuators such as buttons 114, lights 112, switches 116 and knobs that permit the operator to manipulate various body components in the vehicle while inside the cab 14. The actuators are a predetermined locations such that when the body controls and cab controls have been integrated, the actuators are properly wired through the controls. It is unnecessary for the body builder to add additional buttons or actuators. Additionally, the joystick 22 permits precise control of the articulating arm 122 by providing instructions such as moving the arm out, forward, rear, etc. In a preferred embodiment, an upper extent of the body control area 52 is situated below an upper plane defined by the tunnel and illustrated in FIG. 6.

As shown schematically in FIG. 7, body controller 110, preferably a programmable logic controller, receives the cab controls 30 and the body controls 48. Typically, the cab controls 30 and the body controls 48 are connected to the appropriate connection points 108. The cab controls 30 are integrated with the body controls 48 within the body control area 52. The body control area 52 may be adapted to work with a particular body. The actuators for various components from the particular body may be located in predetermined locations. For example, the first button may be to lift the body. Additionally, the cab controls and the body controls are capable of multiplexing with each other.

Figure 6:
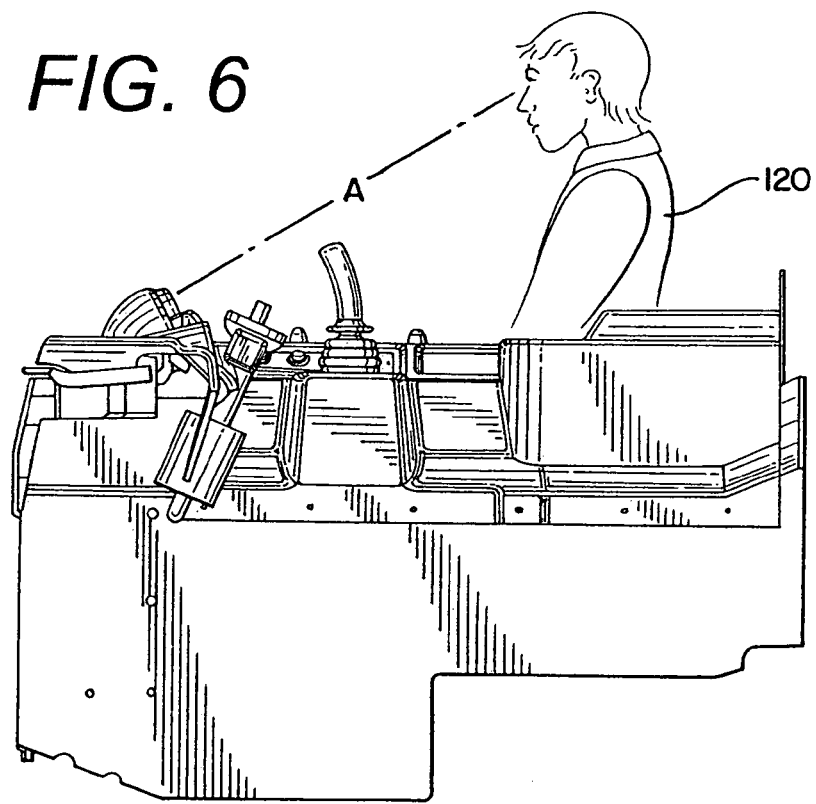
FIG. 6 is a partial side view of an interior of a cab of a vehicle of the present invention.

As shown in FIG. 6, when the body control area 52 is mounted within the cab 14, a line of vision A of an operator 120 seated in an operator seat 18 through the lower passenger-side window 28, the passenger-side mirror 24 or other portion of the passenger door are unobstructed. This permits the operator 120 to drive the vehicle operate the vehicle more efficiently and safely. This unobstructed line of vision is provided by the control of the cab controls and body controls within the body control area 52, or within the control panel of the vehicle. As explained in greater detail below, additional body control housings, boxes and wires are not required to be supported on top of the control panel in stacked fashion.

Figure 8:
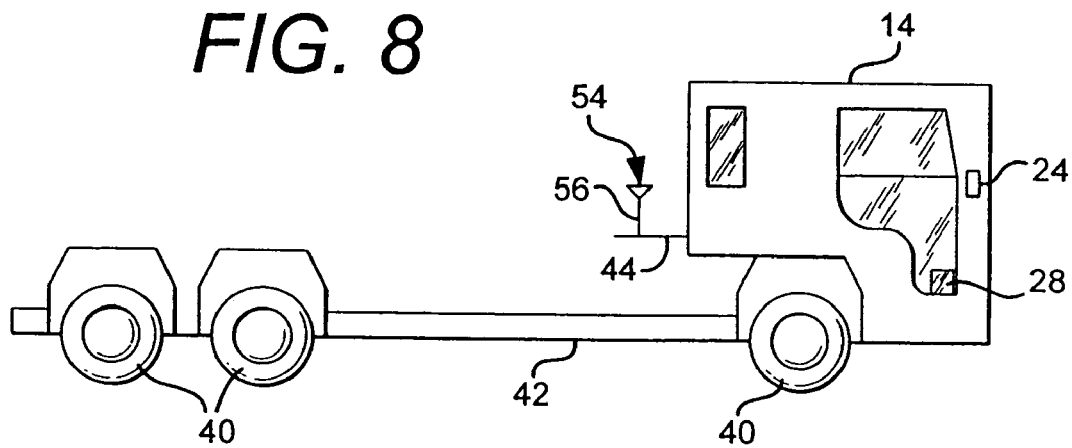
FIG. 8 is a side elevation view of a vehicle of the present invention having a single plug-in; and, FIG. 9 is a partial perspective view of a prior art arrangement of body controls within an interior of a cab of a vehicle.

In an alternative embodiment illustrated in FIG. 8, the connection of the body control area 52 to the body controls 48 is completed by a single plug-in 54 of the body controls 48. The single plug-in 54 replaces the connection point 108 of the wires 32. Upon connection of the single plug-in 54 of the body controls 48, the body control area 52 identifies the particular body and the precise controls associated with that body. The plug-in 54 of the body controls 48 is remote from the cab 14. Preferably, the plug-in 54 is attached to the chassis 42, or more specifically to a bracket 56 attached to a frame member 44 of the chassis 42. Optionally, a second controller is present at plug-in 54 and remote from the cab 14. The second controller may be a programmable logic controller. The second programmable logic controller demultiplexes the signal from the body programmable logic controller 110 to facilitate compatibility with bodies that do not support multiplexing.

In connection with another alternative embodiment of the present invention, the truck may optionally include a diagnostic device 58. The diagnostic device 58 such as a computer is capable of being connected to the body control area 48 and is illustrated in FIGS. 4 and 7. When connected to the body control area 48, the diagnostic device 58 quickly determines the source of a malfunction. The diagnostic device 58 will search and interrogate a cab computer and, if present, a body computer. If a body computer is not utilized, the diagnostic device 58 will search and interrogate the second programmable logic controller in the body. The diagnostic device 58 will determine where the malfunction occurs. For example, if a top door close light does not work, the diagnostic device 58 can quickly determine at what point in the system the signal was lost. This information permits the diagnostic device 58 to determine whether the light bulb is burnt out, the fuse is bad, a circuit is not closed, etc. More basically, the diagnostic device 58 quickly identifies whether a malfunction is caused by the cab controls 30 or the body controls 48. It also can identify the cause of the malfunction, such as whether caused by the component, wiring or computer failure.

Figure 9:
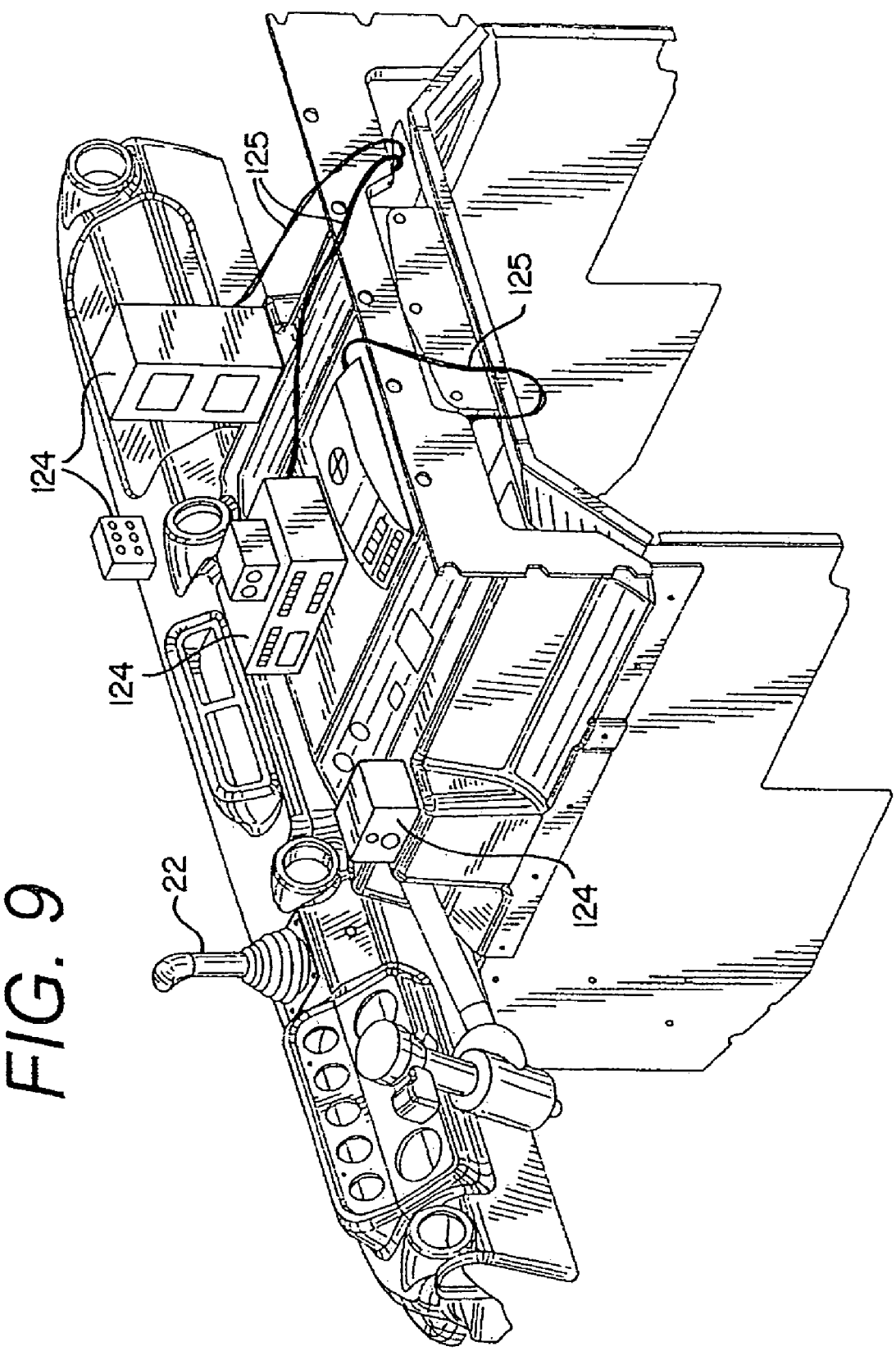

The present invention has numerous benefits. For example, in the past, cab builders would build control areas for the cab controls. Cab builders would not build or leave any place within the cab for the body controls. Accordingly, body builders would place the body controls within a separate box 124 or multiple boxes 124. As shown in FIG. 9, the separate boxes with the body controls were often affixed on top of a control panel the dashboard, stacked on top of a control panel or in another visible location. The separate boxes 124 along with their associated wires 125 and cords 125, in addition to being unsightly and cluttering, often obstructed the operator's line of vision to the passenger-side mirrors and the passenger lower window. Because the line of vision was obstructed, it was more difficult and dangerous for the operator to operate the vehicle. The present invention eliminates the protruding separate boxes that obstruct vision of the operator. With the present invention, the cab controls and body controls are integrated within the control panel wherein it is unnecessary to stack additional boxes on top of the control panel.

Because in the past the control area of the cab was not designed for the body controls, body builders would have to test, often by a trial and error method, to determine the location of certain desired or required switches and wires associated with the cab components. In many cases, the cab was not built with the body builders power and access needs in mind. In these instances, the body builders used wires and connections from the cab that did not have sufficient power or capacity or were otherwise unsuitable. This caused malfunctions more frequently than desired. For example, the body often has a strobe light and/or beeper. The strobe light turns on when the truck is moving in reverse. Consequently, when installing the controls for the strobe light, the body builders search for cab control wiring associated with the reverse function of the truck. When the body builders find that wiring, they splice into the reverse wiring. The body builders connect the strobe light to the reverse wiring such that the strobe light will turn on automatically when the truck is in reverse. The reverse wiring and other wiring desired by the body builders is not in a single location, and thus the body builders run wires in various locations within the cab. The present invention integrates the control area for both the body controls and the cab controls and reduces the chance that a control for a component is connected to an unsuitable switch or wire. Thus, with the present invention, the cab control wire for the vehicle reverse function is associated with a predetermined connection point or receptor. With this knowledge, a technician can take the body control for the strobe light and easily connect it to the receptor for the desired cooperation and integration between these two controls. The same configuration is available for other body controls and cab controls that must cooperate and interact for proper vehicle operation.

Because large vehicles such as refuse trucks have many components, there is occasionally a problem with a component. Because in the past the body builder controls were not integrated nor adapted to work with the cab controls, it was difficult for the owner of the truck to even determine which party—the cab builder or the body builder—was responsible for the malfunction. The present invention integrates the controls for the body controls and the cab controls and permits an owner to more easily determine a source of an error.

It is understood that the present invention integrates the cab controls and the body controls such that once connected, the control wires are automatically connected in a way for proper connection. It is understood that wireless controllers or other types of wireless components could also be incorporated into the invention.

While the specific embodiments have been illustrated and described, numerous modifications come to mind without significantly departing from the spirit of the invention, and the scope of protection is only limited by the scope of the accompanying Claims.

What is claimed is:

1. An integrated control system for a truck having a cab and a body, the integrated control system comprising:
    a plurality of cab controls having a first group of wires associated with components of the cab;
    a plurality of body controls having a second group of wires associated with components of the body; and
    a body control panel disposed within the cab and having a body controller, wherein the body control panel is connected to the plurality of cab controls and the plurality of body controls, and the connection of the body control panel to the body controls is completed by a single plug-in of the body controls.

2. The integrated control system of claim 1 further comprising a diagnostic device capable of being connected to the body control panel and determining whether a malfunction is caused by the cab controls or the body controls.

3. The integrated control system of claim 1 wherein the body control panel identifies the body based upon the single plug-in of the body controls.

4. The integrated control system of claim 1 the plug-in of the body controls is remote from the cab.

5. The integrated control system of claim 1 wherein the plug-in of the body controls is attached to a chassis.

6. The integrated control system of claim 1 wherein the plug-in of the body controls is attached to a frame.

7. The integrated control system of claim 1 wherein the plug-in of the body controls is attached to a bracket, the bracket being attached to a frame.

8. The integrated control system of claim 1 wherein the body controller is a programmable logic controller.

9. An integrated control system for a truck comprising:
    a cab having a tunnel;
    a plurality of cab controls having a first group of wires associated with components of the cab; and
    a body control panel disposed within the tunnel of the cab and having a body programmable logic controller, wherein the body control panel is connected to the plurality of cab controls and adapted to receive a plurality of body controls by a single plug-in, and wherein the body programmable logic controller controls the body controls.

10. A truck having an integrated control system comprising:
    a truck chassis having a frame adapted to receive a truck body;
    a cab connected to the truck chassis;
    a plurality of cab controls having a first group of wires associated with components of the cab;
    a plurality of body controls having a second group of wires associated with components of the truck body; and
    a body control panel disposed within the cab, wherein the control panel is connected to the plurality of cab controls and the plurality of body controls, and the connection of the control panel to the body controls is completed by a single plug-in of the body controls attached to the chassis and remote from the cab.

11. The integrated control system of claim 10 wherein the single plug-in has a body programmable logic controller.

12. A truck having an integrated control panel, the truck comprising:
    a cab having an operator seat, a passenger seat, a passenger-side mirror, a tunnel, a lower passenger-side window;
    a plurality of cab controls having a first group of wires associated with components of the cab and a first controller;
    and at least one cab feature, the at least one cab feature includes a throttle, wherein the tunnel defines an upper plane;
    a chassis having a frame and wheels;
    a body having a storage area, the body and the cab being coupled to the chassis;
    a plurality of body controls having a second group of wires associated with components of the body and a second controller; and
    an integrated body control panel situated within the cab and connected to the plurality of cab controls and the plurality of body controls and having a body programmable logic controller, wherein an upper extent of the integrated body control panel is situated below the upper plane defined by the tunnel.

* * * * *